(12) United States Patent
Bhattacharya

(10) Patent No.: US 12,038,361 B2
(45) Date of Patent: Jul. 16, 2024

(54) SYSTEM AND METHOD FOR DETERMINATION OF VISCOELASTIC PROPERTIES FROM GIVEN TIME-DEPENDENT PENETRATION OF A TEST LIQUID CREEPING INSIDE A CHANNEL

(71) Applicant: TEXAS TECH UNIVERSITY SYSTEM, Lubbock, TX (US)

(72) Inventor: Sukalyan Bhattacharya, Lubbock, TX (US)

(73) Assignee: Texas Tech University System, Lubbock, TX (US)

(*) Notice: Subject to any disclaimer, the term of this patent is extended or adjusted under 35 U.S.C. 154(b) by 853 days.

(21) Appl. No.: 16/626,168

(22) PCT Filed: Jun. 22, 2018

(86) PCT No.: PCT/US2018/039108
§ 371 (c)(1),
(2) Date: Dec. 23, 2019

(87) PCT Pub. No.: WO2018/237331
PCT Pub. Date: Dec. 27, 2018

(65) Prior Publication Data
US 2020/0158612 A1    May 21, 2020

Related U.S. Application Data

(60) Provisional application No. 62/524,302, filed on Jun. 23, 2017, provisional application No. 62/542,389, filed on Aug. 8, 2017.

(51) Int. Cl.
*G01N 11/04* (2006.01)

(52) U.S. Cl.
CPC ..... *G01N 11/04* (2013.01); *G01N 2203/0014* (2013.01); *G01N 2203/0071* (2013.01); *G01N 2203/0094* (2013.01)

(58) Field of Classification Search
CPC ........... G01N 11/04; G01N 2203/0014; G01N 2203/0071; G01N 2203/0094;
(Continued)

(56) References Cited

U.S. PATENT DOCUMENTS 5,847,267 A    12/1998   Janzen
6,484,566 B1 * 11/2002   Shin ................... A61B 5/02035
                                                              73/54.01

(Continued)

FOREIGN PATENT DOCUMENTS

GB       750976 A  *  6/1956
GB      2501530 A  * 10/2013   ............. G01N 11/04
(Continued)

OTHER PUBLICATIONS

Martin Ndi Azese, Modified Time-Dependent PenetrationLength and Inlet Pressure Field in REctangular and Cylindrical Channel Flows Driven by Non-Mechanical Forces, Nov. 2011, Journal of Fluids Engineering, vol. 133/111205-1 (Year: 2011).*

(Continued)

*Primary Examiner* — Marrit Eyassu
(74) *Attorney, Agent, or Firm* — Dickinson Wright PLLC; Kristopher Lance Anderson

(57) ABSTRACT

Disclosed is a system and method for determination of the viscoelastic properties of a viscoelastic substance based on the type of non-mechanical forces which drive the viscoelastic substance inside a channel. These forces may comprise capillary, gravitational, electric, magnetic, or any other type where neither a pump nor any relative velocity between solid surfaces is needed to induce the transport of fluid (Continued)

medium. As a result, the design of the system remains simple, and the system is capable of yielding results devoid of noise produced by mechanical forcing. The present disclosure a general analysis describing extraction of viscoelastic properties by observing flow-systems driven by any non-mechanical means, including capillary force and electro-osmotic force. Such time-dependent penetration depth may be recorded by optical, electrical or mechanical means and may further include the use of a computing device.

21 Claims, 10 Drawing Sheets

(58) Field of Classification Search
CPC ... G01N 2011/0026; G01N 2203/0075; G01N 2203/0089; G01N 2203/0286
USPC .......................................................... 73/54.07
See application file for complete search history.

(56) References Cited

U.S. PATENT DOCUMENTS

| | | | |
|---|---|---|---|
| 6,681,616 B2* | 1/2004 | Spaid | G01N 27/44791 73/54.07 |
| 6,941,797 B2* | 9/2005 | Nowak | G01N 11/06 73/54.08 |
| 7,040,144 B2* | 5/2006 | Spaid | B01L 3/5027 73/54.05 |
| 2003/0066342 A1* | 4/2003 | Shin | A61B 5/02035 73/54.07 |
| 2006/0179923 A1* | 8/2006 | Burns | B82Y 15/00 73/54.13 |
| 2012/0180553 A1* | 7/2012 | Henning | G01N 11/06 29/592.1 |
| 2014/0216140 A1 | 8/2014 | Morhell et al. | |
| 2020/0158612 A1 | 5/2020 | Bhattacharya | |

FOREIGN PATENT DOCUMENTS

| | | |
|---|---|---|
| WO | 2006036833 A2 | 4/2006 |
| WO | 2018237331 A1 | 12/2018 |

OTHER PUBLICATIONS

Suman Chakraborty, Electroosmotically driven capillary transport of typical non-Newtonian biofluids in rectangular microchannels, Analytica Chimica ACTA 605 (2007)175-184 (Year: 2007).*
Prashant R. Waghmare et al., Modeling of combined electroosmotic and capillary flow in microchannels, Jan. 2010, Analytica Chimica Acta 663 (2010) 117-126 (Year: 2010).*
Waghmare, P., et al., "Investigation of combined electro-osmotic and pressure driven flow in rough microchannels". ASME J. Fluids Engineering, 130,pp. 061204-1061204-7. Year:2008.
Waghmare, P., et al., "Modeling of Combined Electroosmotic and Capillary Flow in Microchannels"; Journal: Anal. Chim. Acta; vol. 663; pp. 117-126; Year:2010.
Waghmare, P., et al., "On the Derivation of Pressure Field Distribution at the Entrance of a Rectangular Capillary"; Journal: ASME J. Fluid Eng; vol. 132; pp. 1-4; Year: 2010.
Washburn, E., "The Dynamics of Capillary Flow"; Journal: Phys Rev; vol. 17; pp. 273-283; Year: 1921.
Wolf, F., et al., "Capillary rise between parallel plates under dynamic conditions". Journal of Colloid and Interface Science, 344, pp. 171-179. Year:2010.
Xiao, Y., et al., "A Generalized Analysis of Capillary Flows in Channels"; Journal: J. Colloidal Interface Sci; vol. 298; pp. 880-888; Year:2006.
Zhmud, B., et al., "Dynamics of capillary rise". Journal of Colloid and Interface Science, 228, pp. 263-269. Year:2000.

Zilz, J., et al., "Serpentine channels: micro-rheometers for fluid relaxation times". Lab on a Chip, 14, pp. 351-358. Year:2014.
International Searching Authority, International Preliminary Report on Patentability for PCT/US2018/039108 mailed on Dec. 24, 2019, 7 pages.
International Searching Authority, Written Opinion of the International Searching Authority for PCT/US2018/039108 mailed on Oct. 9, 2018, 10 pages.
Arada, N., et al., "Numerical simulation of shear-thinning Oldroyd-B fluid in curved pipes". IASME Trans. 2, 948-959; Year:2005.
Azese, M., "Modified Time-Dependent Penetration Length and Inlet Pressure Field in Rectangular and Cylindrical Channel Flows Driven by Non-Mechanical Forces"; Journal: J. Fluid Engineering; vol. 33; pp. 111205(1-12); Year:2011.
Barry, D., et al., "A class of exact solutions of Richard's equation". Journal of Hydrology, 142, pp. 29-46. Year:1992.
Bazilevsky, A., et al., "Spontaneousa absorption of viscous and viscoelastic fluids by capillaries and porous substrates". J Colloid Interface Sci. 262, 16-24; Year:2003.
Bhattacharya, S., et al., "Derivation of Governing Equation Describing Time-Dependent Penetration Length in Channel Flows Driven by Non-Mechanical Forces"; Journal: Anal. Chim. Acta; vol. 666; pp. 51-54; Year:2010.
Bhattacharya, S., et al., "Effect of smaller species on the near-wall dynamics of a large particle in bidispersed solution". J. Chem. Phys., 128, p. ARTN.214704. Year:2008.
Bhattacharya, S., et al., "Radial distribution and axial dispersion of suspended particles inside a narrow cylinder due to mildly inertial flow". Phys. Fluids, 25, p. ARTN.033304. Year:2013.
Bhattacharya, S., et al., "Radial lift on a suspended finite-sized sphere due to fluid inertia for low-Reynolds-number flow through a cylinder". J FluidMech.,722, pp. 159-186. Year:2013.
Bhattacharya, S., et al., "Rigorous theory for transient capillary imbibition in channels of arbitrary cross section". Theoretical and Computational Fluid Dynamics, 31, pp. 1-21; Year:2016.
Blawzdziewicz, J., et al., "Comment on "Drift without flux: Brownian walker with a space-dependent diffusion coefficient"". Europhys. Lett., 63, pp. 789-790. Year:2003.
Boukellal, G., et al., "Evaluation of a tube-based constitutive equation using conventional and planar elongation flow optical rheometers". RheologicaActa, 50, pp. 547-557. Year:2011.
Chakraborty, S., "Electroosmotically driven capillary transport of typical non-Newtonian biofluids in rectangular microchannels", Analytica Chimica Acta, Elsevier, Amsterdam, NL, vol. 605, No. 2, Nov. 7, 2007 (Nov. 7, 2007), pp. 175-184.
Chebbi, R., "Dynamics of liquid penetration into capillary tubes". Journal of Colloid and Interface Science, 315, pp. 255-260; Year:2007.
Das, S., et al., "Early regimes of capillary filling". Physical Review E, 86, p. ARTN:067301; Year:2012.
Dreyer, M., et al., "Fluid Motion in Capillary Vanes Under Reduced Gravity"; Journal: Microgravity Sc. Technol.; vol. 4; pp. 203-210; Year: 1993.
Fan, Y., et al., "Fully developed viscous and viscoelastic flow in curved pipes". J Fluid Mech. 440, 327-357; Year:2001.
Felderhof, B., "Estimating the viscoelastic moduli of a complex fluid from observation of Brownian motion". J Chem. Phys. 131, 164904; Year:2009.
Fries, N., et al., "The transition from inertial to viscous flow in capillary rise"; Journal: J. Colloid and Interface Sci; vol. 327; pp. 125-128; Year: 2008.
Groisman, A., et al., "Microfluidic memory and control devices". Science 300, 955-958. Year:2003.
Hamraoui, A., et al., "Analytical Approach for the Lucas-WashBurn Equation"; Journal: J. Colloidal Interface Sci; vol. 250; pp. 415-421; Year: 2002.
Housiadas, K., et al., "The steady annular extrusion of a Newtonian liquid under gravity and surface tension". International Journal for Numerical Methods in Fluids, 33, pp. 1099-1119. Year:2000.
Ichikawa, N., et al., "Interface dynamics of capillary flow in a tube under negligible gravity condition". Journal of Colloid and Interface Science, 162, pp. 350-355. Year: 1993.
Ichikawa, N., et al., "Interface motion of capillary-driven flow in rectangular microchannel". Journal of Colloid and Interface Science, 280, pp. 155-164. Year:2004.

(56) References Cited

OTHER PUBLICATIONS

Jong, W., et al., "Flows in rectangular microchannels driven by capillary force and gravity". International Communications in Heat and Mass Transfer, 34, pp. 186-196. Year:2007.

Kang, Y., et al., "Blood viscoelasticity measurement using steady and transient flow controls of blood in a microfluidic analogue of Wheastone-bridge channel". Biomicrofluidics, 7, p. ARTN:054122; Year:2013.

Kestin, J., et al., "Theory of capillary viscometers". Applied Scientific Research, 27(1), pp. 241-264. Year: 1973.

Khuzhayorov, B., et al., "Derivation of macroscopic filtration law for transient linear viscoelastic fluid flow in porous media". Intl J Engng Sci. 38, 487-505. Year:2000.

Koser, A., et al., "Measuring material relaxation and creep recovery in a microfluidic device". Lab on a Chip, 13, pp. 1850-1853. Year:2013.

Levine, S., et al., "A Theory of Capillary Rise of a Liquid in a Vertical Cylindrical Tube and in a Parallel-Plate Channel"; Journal: J. Colloid and Interface Sci.; vol. 73; pp. 136-151; Year:1980.

Lucas, R., "Ueber das Zeitgesetz des kapillaren Aufstiegs von Flussigkeiten". Kolloid-Zeitschrift, 23, pp. 15-22. Year:1918.

Marmur, A., et al., "Characterization of porous media by the kinetics of liquid penetration: the vertical capillaries model". Journal of Colloid and Interface Science, 189,pp. 299-304. Year: 1997.

Mason, T., "Estimating the viscoelastic moduli of complex fluids using the generalized Stokes-Einstein equation". Rheol. Acta., 39, pp. 371-378. Year:2000.

Mason, T., et al., "Particle tracking microrheology of complex fluids". Phys. Rev. Lett., 79, pp. 3282-3285. Year:1997.

Mawardi, A., et al., "Theoretical analysis of capillary-driven nanoparticulate slurry flow during a micromold filling process". International Journal of Multi- phase Flow, 34, pp. 227-240. Year:2008.

Mitsoulis, E., et al., "Extrudate swell of Newtonian fluids from converging and diverging annular dies". Rheologica Acta, 26, pp. 414-417. Year:1987.

Mora, S., et al., "Saffman-Taylor instability of viscoelastic fluids: From viscous fingering to elastic fracture". Phys. Rev. E 81, 026305. Year:2010.

Navardi, S., et al., "A new lubrication theory to derive far-field axial pressure difference due to force singularities in cylindrical or annular vessels". J Math. Phys., 51, p. ARTN:043102. Year:2010.

Navardi, S., et al., "Axial pressure-difference between far-fields across a sphere in viscous flow bounded by a cylinder". Phys. Fluid, 22, p. ARTN.103306. Year:2010.

Navardi, S., et al., "Effect of confining conduit on effective viscosity of dilute colloidal suspension". J Chem. Phys., 132, p. ARTN: 114114. Year:2010.

Patankar, S., "Numerical Heat Transfer and Fluid Flow". McGraw-Hill. Year: 1980.

Perez-Orozco, J., et al., "Interfacial shear rheology of interacting carbohydrate polyelectrolytes at the water-oil interface using an adapted conventional rheometer" Carbohydrate Polymers, 57, pp. 45-54. Year:2004.

Quere, D., "Inertial capillarity". Eur. Phys. Lett. 39, 533-538. Year:1997.

Rosendahl, U., et al., "Convective dominated flows in open capillary channels"; Journal: Phy. of Fluids; vol. 22; pp. 052102(1-13);Year:2010.

Rousse, P., "A theory of the linear viscoelastic properties of dilute solutions of coiling polymers". J Chem. Phys. 21, 1272-1280. Year:1953.

Squires, T., "Nonlinear microrheology:bulk stresses versus direct interactions". Langmuir, 24, pp. 1147-1159. Year:2008.

Stange, M., et al., "Capillary driven flow in circular cylindrical tubes". Physics of Fluids, 15, pp. 2587-2601. Year:2003.

Sumanasekara, U., et al., "Transient penetration of a viscoelastic fluid in a narrow capillary channel". J Fluid Mech., 830, pp. 528-552. Year:2017.

Szekely, J., et al., "The rate of capillary penetration and the applicability of The Washburn equation". Journal of Colloid and Interface Science, 35, pp. 273-278. Year:1970.

Waghmare, P., et al., "A comprehensive theoretical model of capillary transport in rectangular microchanels"; Journal: Microfluidic Nanofluid; vol. 10; pp. 1-11; Year:2011.

Waghmare, P., et al., "Finite reservoir effect on capillary flow of microbead suspension in rectangular microchannels"; Journal: J. Colloid and Interface Sci; vol. 351; pp. 561-569; Year:2010.

\* cited by examiner

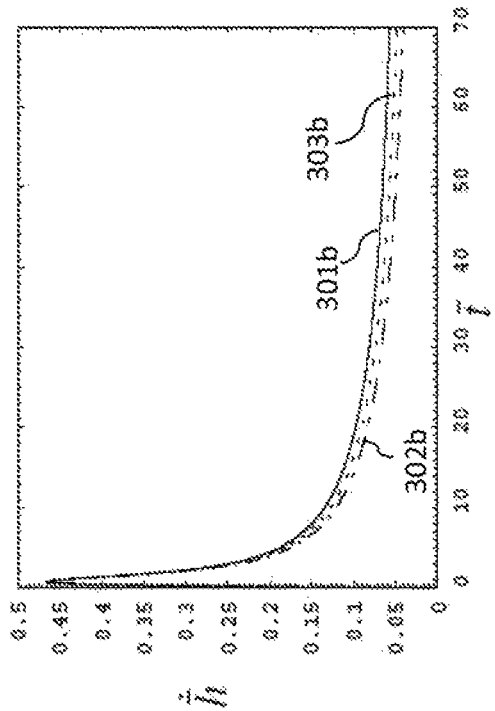
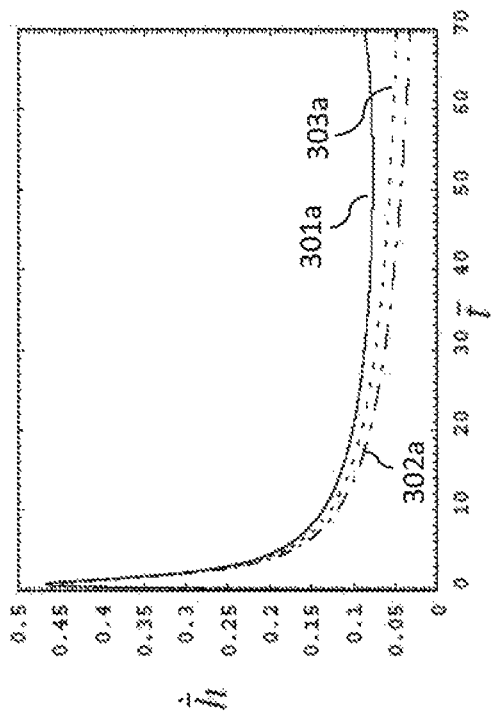
FIG. 3A
FIG. 3B

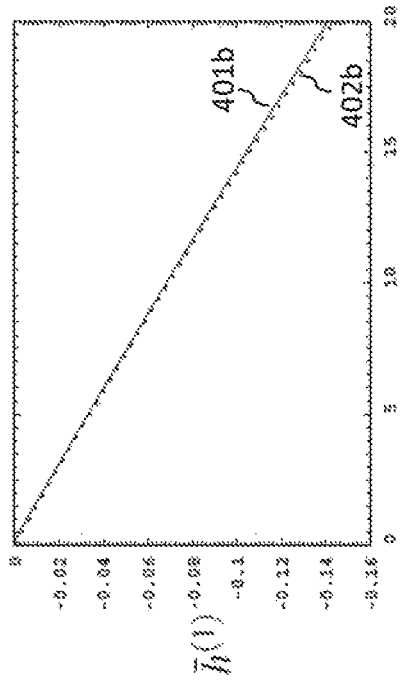
FIG. 4A
FIG. 4B
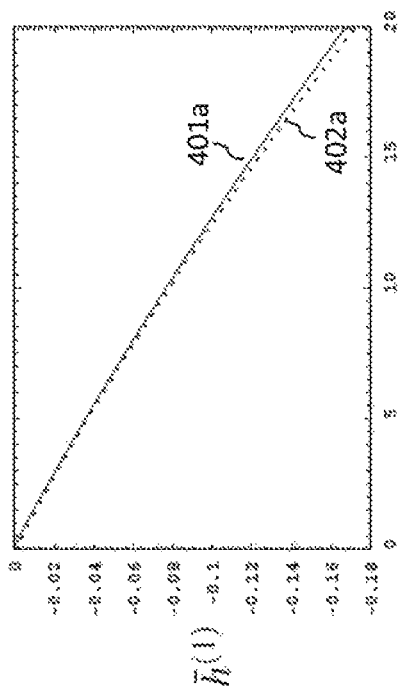
FIG. 4C
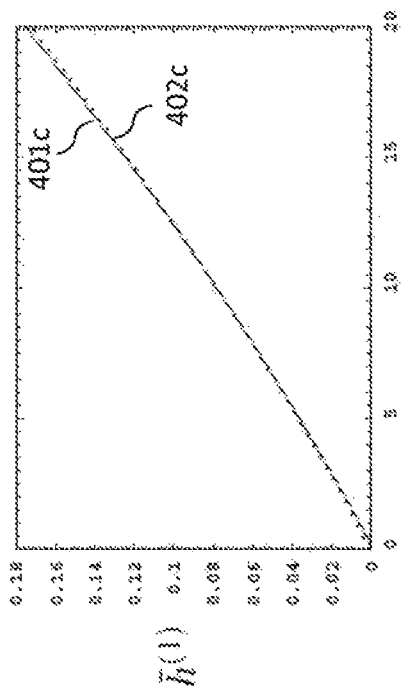
FIG. 4D

SYSTEM AND METHOD FOR DETERMINATION OF VISCOELASTIC PROPERTIES FROM GIVEN TIME-DEPENDENT PENETRATION OF A TEST LIQUID CREEPING INSIDE A CHANNEL

CROSS-REFERENCE TO RELATED APPLICATIONS

This application is a 35 U.S.C § 371 national application of PCT Application No. PCT/US2018/039108, filed on Jun. 23, 2018, entitled "SYSTEM AND METHOD FOR DETERMINATION OF VISCOELASTIC PROPERTIES FROM GIVEN TIME-DEPENDENT PENETRATION OF A TEST LIQUID CREEPING INSIDE A CHANNEL", which claims priority to: (1) U.S. Provisional Application Ser. No. 62/524,302 filed Jun. 23, 2017 entitled "SYSTEM AND METHOD FOR DETERMINATION OF VISCOELASTIC PROPERTIES OF SUBSTANCES WITHIN A CHANNEL" and (2) U.S. Provisional Application Ser. No. 62/542,389 filed Aug. 8, 2017 entitled "SYSTEM AND METHOD FOR DETERMINATION OF VISCOELASTIC PROPERTIES FROM GIVEN TIME-DEPENDENT PENETRATION OF A TEST LIQUID CREEPING INSIDE A CHANNEL." These applications are incorporated herein by reference in their entirety.

STATEMENT OF FEDERALLY FUNDED RESEARCH

This invention was made in part with government support under the National Science Foundation, grant CBET-1034461. The government has certain rights in the invention.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

TECHNICAL FIELD

The present disclosure relates in general to the field of fluid measurement. In particular, the system provides for determination of viscoelastic properties of substances for purposes of product testing and quality control. The disclosed systems and methods support a wide variety of scenarios and include various embodiments for measurements of viscoelastic substances using unsteady dynamics of a penetrating fluid inside narrow gaps.

BACKGROUND OF THE DISCLOSURE

Viscoelastic substances are typically characterized by frequency-dependent coefficients known as G' and G". These rheological coefficients dictate the amplitude and the phase difference of a sinusoidal strain-rate in the liquid medium under the action of a sinusoidal stress. At present, very expensive and time-consuming instruments are used to find G' and G" as functions of the forcing frequency where stress response due to some kind of sliding oscillation is measured by piezoelectric materials.

It is therefore a need in the art to develop an economically feasible rheological measurement capabilities, while ensuring such techniques are rapid, accurate, and simple to use.

SUMMARY OF THE DISCLOSURE

The present disclosure addresses failings in the art by providing a system and method for measuring the rheological coefficients of a liquid medium by utilizing the observed time-dependent penetration data of a creeping viscoelastic substance inside a narrow channel. A newly formulated complete flow theory relating the complex viscosity of the medium to its time-dependent penetration length is then used to create an algorithm yielding a fast, accurate and easy-to-use method that substantially reduces instrumentation cost for rheological measurements.

It is therefore an object of the present disclosure to provide a system wherein a viscoelastic substance creeps through a narrow channel under the action of one or many non-mechanical forces. The process represents an unsteady phenomenon varying with time t, because the substance slows down as it encroaches a greater length in the gap. The aforementioned time-dependence can be manifested by a temporal function representing the varying penetration h(t) of the substance. It is therefore an object of the present disclosure that recognizes and observes that any such unsteady dynamics is bound to reveal the frequency-dependent rheological coefficients, as is herein presented.

In one aspect, a system is based on the type of non-mechanical forces which drive the viscoelastic substance inside a channel. These forces may comprise capillary, gravitational, electric, magnetic, or any other type where neither a pump nor any relative velocity between solid surfaces is needed to induce the transport of fluid medium. As a result, the design of the system remains simple and capable of yielding results devoid of noise produced by mechanical forcing. In subsequent sections, the present disclosure a general analysis describing extraction of viscoelastic properties by observing flow-systems driven by any non-mechanical means. Such time-dependent penetration depth may be recorded by optical, electrical or mechanical means.

In another aspect, the system the provides an axisymmetric rheometer for the viscoelastic substance to seep into the gap between two parallel plates through a vertical hole, and spreads radially along the bounding wall due to the action of a non-mechanical force.

Other aspects of the invention of the present disclosure utilize channels with varying gap-width. Such embodiments can involve either a one-dimensional conduit with slowly changing cross-section or an axisymmetric flow-domain between two non-planar planes with gradual undulation. The variation in the channel-dimension perpendicular to the predominant direction of flow can induce enhanced unsteady features. As a result, sensitivity and accuracy of the equipment can be increased.

The cost of the system of the present disclosure may be further reduced by considering open channel flows where at least one of the surfaces extended in the direction of flow would be a free surface; provided that such embodiment may have less sensitivity compared to the closed conduit version, because in closed conduits the non-mechanical force can drive the fluid more effectively.

It is therefore an object of the present disclosure to provide a system for determining viscoelastic properties of a viscoelastic substance comprising: a free surface for introduction of said viscoelastic substance in the form of a drop; an inlet in a capillary channel brought in contact with said free surface for receiving said viscoelastic substance; and a capillary channel in fluid communication with said inlet and, wherein the capillary channel has an area A and a perimeter s, the capillary channel is arranged horizontally to the free surface so that gravity does not affect flow dynamics, the capillary channel has a longitudinal direction, and the viscoelastic properties are based upon measurement of time-dependent penetration of a creeping viscoelastic substance under the action of the capillary force.

In another aspect the system further comprises an electric potential applied to the longitudinal direction of the capillary channel, wherein the electrical potential can induce additional transiency in the flow of the viscoelastic substance by an electro-osmotic force, wherein the measurement of time-dependent penetration of a creeping viscoelastic substance having fluctuating electric potential on the inside of the capillary channel is capable of determining the frequency-dependent viscosity of the viscoelastic substance.

In one aspect of the system, the non-mechanical forces measured are selected from a group consisting of: capillary, gravitational, electric, magnetic, and combinations thereof. In another aspect the non-mechanical forces measured comprise one or more forces not requiring relative velocity between solid surfaces in order to induce the transport of a viscoelastic substance. The system further provides for determining rheological coefficients G' and G" to further determine the amplitude and the phase difference of a sinusoidal strain-rate in the viscoelastic substance under the action of a sinusoidal stress. The present disclosure further comprises conveniently (including rapidly) determining the frequency-dependent coefficients of a viscoelastic substance by correlating the unsteady dynamics of the viscoelastic substance flow by relating the complex viscosity of the viscoelastic substance to its time-dependent penetration length within the capillary channel.

It is another object of the present invention to provide a device for measuring viscoelastic properties of a viscoelastic substance comprising a drop of viscoelastic substance with free surface capable of being a source of fluid transport to a capillary channel; an inlet for introduction of the said viscoelastic substance from the said drop to a fluid communication due to the sole or combined actions of non-mechanical forces; a capillary channel in fluid communication with said first opening, wherein the capillary channel has an area A and a perimeter s, and the capillary channel is arranged horizontally to the free surface; and at least one rheometric measurement instrument for time versus penetration data, wherein the viscoelastic substance in fluid communication with the capillary channel is capable of creeping into the capillary channel and capable of measurement with the at least one measurement instrument.

In one aspect the capillary channel is a narrow one-dimensional channel having a determined cross-section. In another aspect the capillary channel is a closed channel wherein non-mechanical force is capable of driving the viscoelastic substance. Additionally, the closed channel may be rectangular, square, or circular. In another aspect the closed channel is an axisymmetric rheometer and may further be comprised of an open channel flow having at least one surface which is a free surface.

In one aspect, the device's at least one measurement instrument is capable of determining the rheological coefficients G' and G" to further determine the amplitude and the phase difference of a sinusoidal strain-rate in the viscoelastic substance under the action of a sinusoidal stress. The at least one measurement instrument is capable of rapid and convenient determination of the frequency-dependent viscoelastic coefficients by relating the complex viscosity of a medium to its time dependent penetration length within a capillary channel.

The device may utilize one or more computing devices for processing information collected by the at least one measurement instrument.

It is another object of the present invention to provide a method for determining viscoelastic properties of a viscoelastic substance comprising: introducing a viscoelastic substance in the form of a drop onto a free surface having an inlet to a capillary channel through said inlet of the capillary channel via non-mechanical forces, wherein the step of introducing the viscoelastic substance into the channel comprises placing the viscoelastic substance on the free surface having contact with the inlet; measuring the time-dependent penetration of a creeping viscoelastic substance inside the capillary channel; and determining the frequency-dependent viscosity of the viscoelastic substance driven by capillary force of the viscoelastic substance in the capillary channel.

In one aspect, the method further comprises determining the rheological coefficients G' and G" to further determine the amplitude and the phase difference of a sinusoidal strain-rate in the viscoelastic substance under the action of a sinusoidal stress. In another aspect the method further comprises determining the frequency-dependent coefficients of a viscoelastic substance by correlating the unsteady dynamics of the viscoelastic substance flow by relating the complex viscosity of the viscoelastic substance to its time-dependent penetration length within the channel.

The recording time-dependent penetration depth by optical, electrical or mechanical means. In another aspect, the non-mechanical forces are measured via capillary, gravitational, electric, magnetic, and combinations thereof. In another aspect, the method measures one or more non-mechanical forces not requiring relative velocity between solid surfaces in order to induce the transport of a viscoelastic substance. In another aspect, the method determines rheological coefficients G' and G" to further determine the amplitude and the phase difference of a sinusoidal strain-rate in the viscoelastic substance under the action of a sinusoidal stress.

In another aspect of the present disclosure, the method quickly and conveniently determines the frequency-dependent viscoelastic coefficients by relating its complex viscosity of a medium to its time dependent penetration length within a channel.

Accuracy of the measurement can also be increased by considering a multiple channel system. In that case, a number of simultaneous results can be obtained from each unit. A subsequent averaging would then reduce statistical error.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 3A-3B depicts a chart where penetration rate is plotted as function of time for facilitating (solid lines 301a, 301b), opposing (dash-dot lines 302a, 302b) and neutral (dotted lines 303a, 303b) electric potentials with, respectively, $l^-=10$ (FIG. 3A) and $l^-=30$ (FIG. 3B).

FIGS. 4A-4D depicts a chart where computed values (solid lines 401a-401d) of first-order penetration length are compared with its approximate analytical expression in Eq. 29 (dotted lines 402a-402d) for opposing (FIGS. 4A-4B) and facilitating (FIGS. 4C-4D) electric potentials with, respectively, $l^-=10$ (FIGS. 4A, 4C, respectively) and $l^-=30$ (FIGS. 4B, 4D, respectively).

DETAILED DESCRIPTION OF THE DISCLOSURE

Figure 1A:
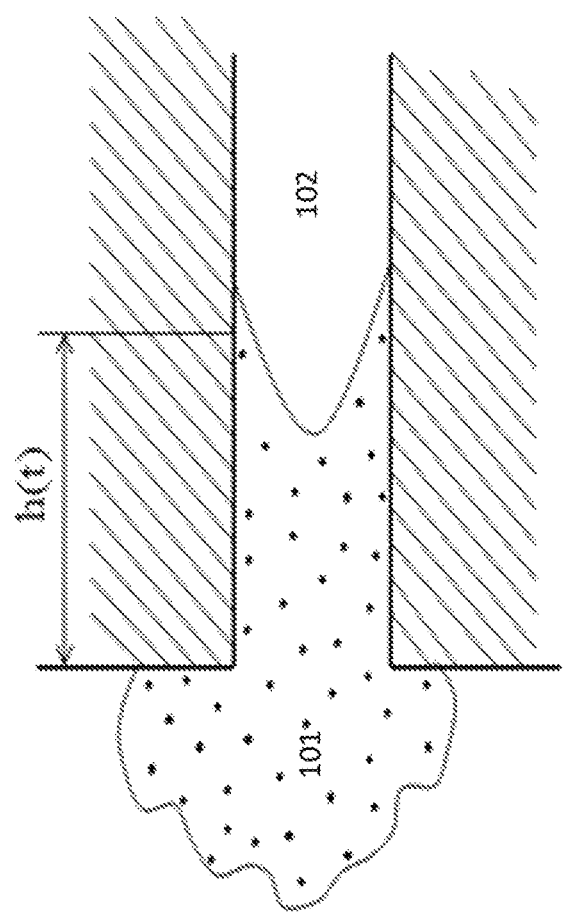
FIG. 1A depicts a side perspective view of an encroaching column of viscoelastic fluid entering into a rectangular channel.

While the making and using of various embodiments of the present disclosure are discussed in detail below, it should be appreciated that the present disclosure provides many applicable inventive concepts that can be embodied in a wide variety of specific contexts, goods, or services. The specific embodiments discussed herein are merely illustrative of specific ways to make and use the disclosure and do not delimit the scope of the disclosure.

All publications and patent applications mentioned in the specification are indicative of the level of skill of those skilled in the art to which this disclosure pertains. All publications and patent applications are herein incorporated by reference to the same extent as if each individual publication or patent application was specifically and individually indicated to be incorporated by reference.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, compositions, or systems. Accordingly, embodiments may, for example, take the form of methods, compositions, compounds, materials, or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

At present, viscoelastic properties are measured by conventional rheometers where typically oscillatory relative motion is imparted to two solid surfaces, and resultant shear stress is measured by piezoelectric materials. The equipment costs over $20,000, and requires considerable expertise to operate. The involved experiments are also time-consuming. Moreover, due to the motion of solid surfaces, there are random vibrations which need to be filtered out in order to get proper result. In contrast, the proposed device based on the present disclosure does not possess any moving solid surface—here the motion is generated in the fluid medium only by non-mechanical forces like, for example capillary or electro-osmotic forces. As a result, the disclosed rheometric system is inexpensive, easy-to-use and free of vibration.

Apart from conventional rheometers, current micro-rheological studies are trying to exploit the displacement-time data for a Brownian particle in a viscoelastic medium for rheological measurements. The Brownian technique, however, requires a powerful and expensive microscope to observe the particle over a long time. As a result, this technology reduces neither cost nor difficulties associated with determination of frequency-dependent properties. The only advantage of such microscopic process is that it uses very small volume of the material, and does not destroy it due to the action of stressful sliding motion. Consequently, the method can be adapted for repeated testing for precious and fragile samples, like biological fluids.

The issue of repeated testing is also addressed by expensive devices like Fourier micro-rheometer which typically uses very small volume of fluid (order of micro-liters) in spite of following the same principle of a conventional rheometer. The system of the present disclosure removes very little amount of fluid as well, while drawing it inside the micro-channel—order of micro-liters of liquid volume would be sufficient. Thus, the system of the present disclosure can be appropriate for repeated testing and maintains considerable competitive advantage over existing microinstruments as the latter cannot provide any added advantage from cost and convenience perspective.

In one embodiment a device comprises a narrow one-dimensional channel of arbitrary cross-section through which a viscoelastic substance can be driven due to any of the non-mechanical forces. One example of such systems is shown in FIG. 1A where the specific conduit has a rectangular shape wherein the fluid property can be expressed in terms of the frequency-dependent complex viscosity given by $\eta_0 \eta(\omega)$ where non-dimensional rheological coefficient $\eta(\omega)$ normalized by steady-state viscosity $\eta_0$ is a complex function of frequency $\omega$. This analysis shows that $\eta(\omega)$ can be obtained by solving the following equation:

$$\sum_n \frac{a_n \hat{F}(\overline{\omega})}{i\overline{\omega} + \lambda_n^2 \eta(\overline{\omega})} = i\overline{\omega}\hat{g}(\overline{\omega}). \quad (A-1)$$

Here, the frequency-dependent functions $\hat{F}$ and $\hat{g}$ are known from the recorded time-dependent penetration depth h(t)

$$\hat{F}(\overline{\omega}) = \int_0^\infty e^{-i\overline{\omega}\bar{t}} F(\bar{h}) d\bar{t} \text{ and } \hat{g}(\omega) = \int_0^\infty e^{-i\overline{\omega}\bar{t}} \frac{d\bar{h}}{d\bar{t}} d\bar{t}, \quad (A-2a, b)$$

with F(h) being the non-dimensional force-density which drives the fluid. For a certain non-mechanical force, exact form of F(h) will be explicitly known from the relevant constitutive relations. The constants $\alpha_n$ and $\lambda_n$ are defined as below:

$$a_n = \frac{\int v_n d\overline{A}}{\overline{A}} \text{ and } \nabla^2 v_n = -\lambda_n^2 v_n, \quad (A-3a, b)$$

so that the first is the average and the second represents the Eigen values of the normalized Eigen functions $v_n$. As $v_n$ are orthogonal functions, these satisfy the orthogonality relation $$\int v_n v_m d\overline{A} = \delta_{nm}, \quad (A-4)$$

with $\delta_{mn}$ being the Kronecker delta. The quantities with bar at the top indicate non-dimensional variables or parameters. For example, $$\bar{h} = \frac{hs}{A}\sqrt{\frac{\eta_0^2 s}{A\rho\gamma}}, \bar{t} = \frac{t\eta_0 s^2}{\rho A^2}, \overline{\omega} = \frac{\omega\rho A^2}{\eta_0 s^2}, \overline{A} = \frac{A}{s^2} \quad (A-5)$$

are the non-dimensional penetration length, time, frequency and area normalized by respective scales. In these expressions, s, A, $\rho$, $\gamma$, $\omega$ are considered to be cross-sectional perimeter, cross-sectional area, fluid density, surface tension coefficient and dimensional frequency.

The frequency-dependent viscosity can be evaluated by the following embodiments. Firstly, h(t) has to be recorded by either optical or electrical or mechanical means. Then, the derivative of h with respect to t is to be calculated from the stored data, and the function F(h) is to be determined by using h and its derivatives in the expression for constitutive relation describing the driving non-mechanical force. For example, if this force is gravity, F would be simply a constant. On the other hand, if the liquid-column is moving under the action of capillary force, F would be inversely proportional to h. Once temporal derivatives and F(h) are available, one can find the frequency-dependent functions $\hat{F}$ and $\hat{g}$ from Eq.A-2a,b. Also the constants $\alpha_n$ and $\lambda_n$ will be obtained from Eq.A-3a,b. Finally, the non-dimensional frequency-dependent complex viscosity $\eta(\omega)$ can be computed by solving Eq.A-1. The viscoelastic coefficients G' and G" are related to $\eta(\omega)$ by known simple expressions. Thus, the outlined procedure will render the desired viscoelastic coefficients without incurring extensive cost or creating error-inducing noises.

Capillary viscometry or rheometry can be an efficient non-destructive procedure to measure frequency dependent complex viscosity of various liquid-like substances. Such rheological properties are especially important to understand fundamental physiological state of biological samples which are typically very precious and fragile at the same time. Conventional rheometers may not be appropriate for this purpose as the induced stresses can destroy or modify the materials like human body fluid or animal extracts prohibiting repeated testing. On the other hand, microrheological techniques designed for these applications are both expensive and time-consuming, as these depend on observing and recording Brownian motion of a small tracer particle. In contrast, one can build a device based on the common knowledge that any transient motion in a fluid can reveal its rheology. This means that if unsteady penetration length of a viscous medium is recorded as function of time, the resulting data can be analyzed to determine the rheological coefficients.

The process can be further effective if additional temporal variation is imposed by electro-osmotic effect. As both surface tension and electro-osmosis generate mild non-mechanical forcing, the detection process would not alter the test medium of interest. This approach, however, requires an accurate theoretical prediction so that simulated dynamics of known systems can be compared to the experimental observation for reliable estimation of the desired quantities. Unfortunately, all available theories on this topic is inadequate for this purpose due to leading order errors in the formulation. The present invention addresses this problem by providing a rheological device that eliminates this removable error in the mathematical model describing the intrusion dynamics. Accordingly, it presents a rigorous analysis of time-dependent encroached length of a viscous liquid in a narrow capillary channel in presence of both surface tension and electro-osmotic forces.

Unsteady liquid filling in a narrow tube is a complex transport phenomenon where the interplay between surface tension and viscous dissipation plays a crucial role. The process becomes especially more complicated in presence of electro-osmotic force caused by an electric field along the direction of motion if free charges exist. Such effect not only modifies the dynamics of the fluid but also can act as an external influence for flow-control purposes if manipulated properly. The aforementioned novel rheometric applications require a strong transient behavior in the system to properly reveal the frequency-dependent properties. In absence of electro-osmotic effect, the unsteady variation in fluid motion slows down with time, as increased intruded length causes enhanced viscous dampening. As a result, there would be a small temporal range in which the recorded penetration data would be useful for rheological prediction. Electro-osmotic force due to a properly manipulated external potential can help in this respect by inducing additional variations in time facilitating the measurement process.

Apart from rheometry, the flow driven by non-mechanical forces like surface tension (capillary) or electro-osmotic effect is typically important in natural and industrial systems with high surface-to-volume ratio. For example, this phenomenon is the predominant mechanism behind ground water percolation as well as in transport through xylem ducts of plants. Similarly, several technologies like micro-extrusion, lithography and printing mechanisms depend on the dynamics of encroaching fluid for proper performance. In these processes, electro-osmosis can be used to control the motion of the penetrating medium. Such an effect can substantially modify species diffusion and suspension dynamics inside an encroaching fluid. As a result, electro-osmotic force on confined liquid can be manipulated to enhance the performance of lab-on-chip devices and microfluidic separation.

Surprisingly, the available theoretical studies of the unsteady capillary penetration are based on key assumptions which are not valid if the temporal variations in the hydrodynamics fields are large. These formulations have used integral approach where the rate of intrusion is described by equating total force acting on the entire domain to rate of change of total momentum. Unfortunately, while doing so, the viscous resistance on the fluid is assumed to be the same as in a steady system. Such consideration is only valid for slow changes in time, because velocity profile would, otherwise, deviate substantially from its quasi-steady version. This error is well documented in applicant's recent studies where it is established that the pseudo-steady approximation creates around 20% discrepancy. The inaccuracy is especially considerable for the applications where the temporal acceleration of the fluid is comparable with the viscous dissipation. Such parity between temporal and dissipative effects is precisely needed for good rheometric measurements. Moreover, the two terms are usually competitive for a considerable time-range in all other systems with intruding liquid in presence of electro-osmotic force. In such situation, the available theories would have finite and removable error in the prediction of time-dependent penetration length. Thus, a new mathematical treatment is required to address this issue so that accurate description of the dynamics can be provided even if capillary and electro-osmotic forces create strong transient variations.

The principles discussed herein may be embodied in many different forms. The preferred embodiments of the present disclosure will now be described where for completeness, reference should be made at least to the Figures.

The present invention provides a device capable of measuring viscoelastic properties by inducing transiency in a viscoelastic fluid medium by either the capillary force alone or the combined impact of capillary and electro-osmotic forces affecting unsteady encroachment of a liquid in a narrow conduit. This analysis considers the transient velocity itself as a dependent variable which is described by using an Eigen function expansion with unknown time-dependent amplitudes. These amplitudes along with the un-steady intruded length are evaluated from a system of ordinary differential equations. As a result, unnecessary error in the calculation of the transient penetration can be removed to accurately estimate the influence of electro-osmotic force on capillary flow. Additionally, the same approach can be generalized for encroaching viscoelastic medium leading to novel rheometric technologies.

In an exemplary embodiment a, a long and narrow capillary channel with area A and perimeter s is considered. The conduit is horizontally placed and initially filled with a static liquid column of length $h_0$. The prefilled fluid is introduced for effective rheometric prediction. The arrangement is brought in contact of a drop of the same viscous medium whose density and viscosity are $\rho$ and $\mu$. It is assumed that the empty part of the conduit is totally unwetted as long as it is not being occupied by the encroaching medium. An electric potential is applied in the longitudinal direction of the vessel so that an electro-osmotic force along with the surface tension can drive the flow. The contact point between the drop and the tube is near the free-surface of the former so that gravity does not interfere with the dynamics. The system is schematically described in FIG. 1D.

Figure 1B:
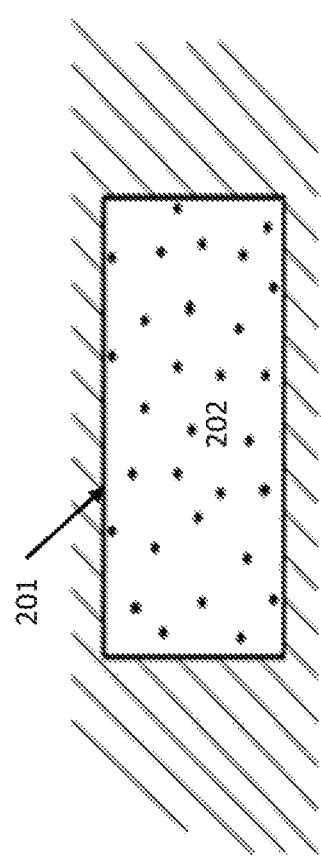
FIG. 1B depicts a cross-sectional view of a rectangular channel containing viscoelastic fluid.

Turning to FIG. 1A, one aspect of an exemplary embodiment of the present invention is provided, wherein a gradually encroaching column of viscoelastic substance 101 is observed creeping through a channel 102. This simple exemplary embodiment comprises a determined-arbitrary cross-section through which a viscoelastic substance can be driven due to any of the non-mechanical forces. Fluid properties may then be expressed in terms of the frequency-dependent complex viscosity where a non-dimensional rheological coefficient normalized by steady-state viscosity may then be calculated. FIG. 1B provides a cross-sectional view of a rectangular channel 201 containing a viscoelastic substance 202. The determination of the viscoelastic substance's non-dimensional penetration length, time, frequency and area normalized by respective scales and considering the cross-sectional perimeter, fluid density, surface tension coefficient, and dimensional frequency.

Figure 1C:
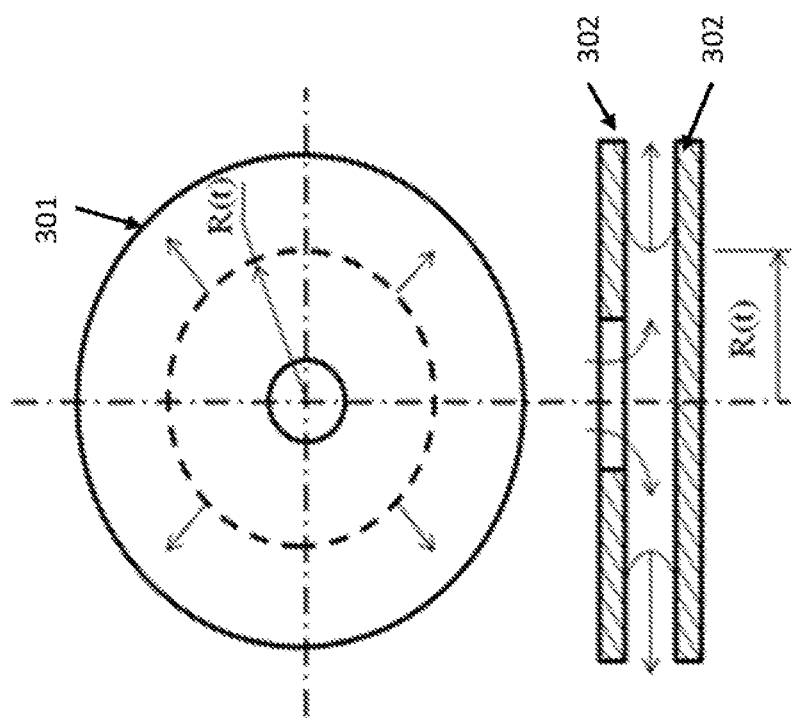
FIG. 1C depicts a top and side perspective view of an axisymmetric rheometer with radially spreading viscoelastic fluid.

FIG. 1C presents both a top perspective view and side perspective view of an alternative embodiment of the present invention, wherein a radial system 301 is deployed. In this embodiment, the viscoelastic substance 303 seeps into a gap between two parallel plates 302 through a vertical hole, and spreads radially along the bounding wall due to the action of non-mechanical force(s), as further described herein. In this aspect, time-dependent spread-radius R(t) will be measured as a temporal function. Then, the body force F will be considered as a known function of R instead of h from the constitutive relation for the relevant non-mechanical force driving the viscoelastic substance. If such modifications are incorporated, the similar methodology as presented may determine the rheological properties from the axisymmetric two-dimensional flow.

Figure 1D:
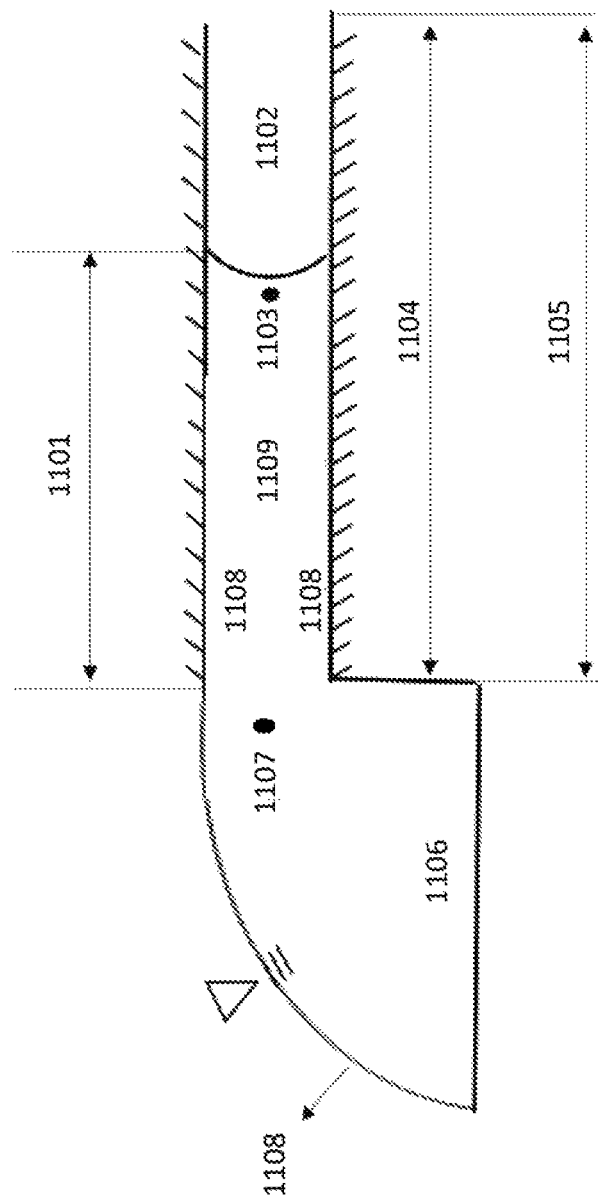
FIG. 1D depicts a schematic of the present disclosure having a capillary channel transport fluid from a drop with free-surface due to surface tension effect.
Figure 1E:
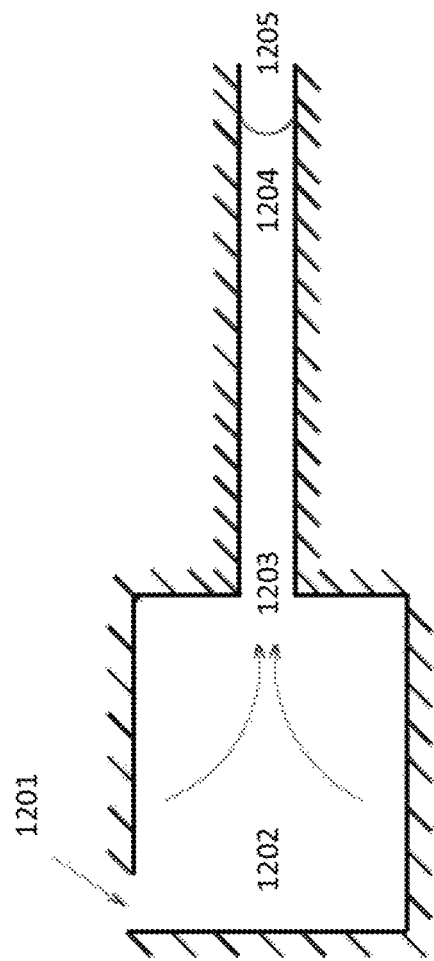
FIG. 1E depicts a schematic having a supplied fluid body in a confined in an infinite channel requiring a mathematical model for entry loss before the entrance.

FIG. 1D represents an exemplary horizontal capillary channel 1104 and perimeter of a device of the present invention. It is initially prefilled with a liquid column of a determined length h0 and in contact with a drop of the same viscoelastic substance near the inlet 1106. The empty part of the capillary channel 1104 is totally unwetted as long as it is not being occupied by the intruding viscoelastic substance 1101. Wall zeta potential $\psi_w$ 1108 is determined, as is permittivity 1109, 1102 between the substance and the capillary channel 1104, for further characterization of the time-dependent spread-radius. Pressure field measurements 1107, 1103 further allowing for time-dependent potential determination. The cross-sectional dimension of the capillary channel 1104 is assumed to be much smaller than the size of the drop so that it can be approximated as an infinite reservoir with a free surface. The contact point between the substance and the channel is very near to the free-surface so that the flow inside the vessel is solely driven by capillary action without any gravitational influence. When applied for a viscous medium, an electric potential is applied in the longitudinal direction of the device 1105 comprising the capillary channel 1104. FIG. 1E describes prior rheometric devices which require that pressure 1202 at the entry point 1201 has to be evaluated by modeling the outside flow to determine pressure differences 1203 at the capillary channel and at the leading edge of the substance 1204 down the capillary channel's distal end 1205. Such modeling is not needed in the present invention as the atmospheric condition prevails at the entrance of the system of the present invention.

The device of the present invention may be further assumed to be prefilled by a liquid column of initial length $h_0$. The need for such partial filling may be anticipated for accurate rheological measurement.

In further addressing electro-osmotic conditions, it is confirmed that the unsteady flow in the majority of the channel interior is unidirectional. The governing equation for such transient transport is given by:

$$\rho \frac{\partial v}{\partial t} = \mu \nabla_{\parallel}^2 v - \frac{\partial p}{\partial z} + f_{os}, \quad (1)$$

where the pressure field p and unidirectional velocity v are described in terms of time t and spatial coordinates whose derivatives in the cross-sectional plane are denoted by $\nabla_{\parallel}$. Also, effect of the electric field on the medium is represented by a body force term $f_{os}$ which is electro-osmotic force per unit volume of the fluid in the direction of flow along the z axis.

The electro-osmotic term is well described in various earlier works, where $f_{os}$ is considered as a product of electric field $E_{lz}$ along z and free charge density $\rho_e$. The expression of $E_{lz}$ and $\rho_e$ is imported in a modified representation so that each is factorized in dimensional constants and non-dimensional variations. Accordingly, it is recognized that $E_{lz}$ only depends on the penetration length and imposed time-dependent potential along the direction of flow. In contrast, $\rho_e$ contains only cross-sectional variation given by a solution of the Poisson-Boltzmann equation for electrostatic double layer, where Debye-Huckel linearization defined by Debye length k relates the charge density to wall zeta potential $\psi_w$. These well-known results are summarized as below:

$$E_{lz} = (\varepsilon_g \Phi_0/\varepsilon_l l) \bar{f}(h,t) \rho_e = -k^2 \varepsilon_l \psi_w \bar{g}(r_{\parallel}), \quad (2)$$

where air permittivity $\varepsilon_g$, liquid permittivity $\varepsilon_l$, channel-length l, and nominal scale for potential difference $\Phi_0$ are constant parameters. The dimensionless function $\bar{f}$ is time-dependent, if the imposed potential shows transiency represented by a non-dimensional temporal variation $\bar{\Phi}$. The ratio of $\varepsilon_g$ and $\varepsilon_l$ as well as the ratio of encroached length h and channel length l relate $\bar{f}$ and $\bar{\Phi}_0$ uniquely $$\bar{f} = \frac{1}{1 - (h/l)(1 - \varepsilon_g/\varepsilon_l)} \bar{\phi}(t). \quad (3)$$

On the other hand, the other non-dimensional function $\bar{g}$ is only related to the cross-sectional position ru governed by the linearized Poisson-Boltzmann equation in a specific conduit geometry enforcing the relation between the charge density and the wall zeta potential. Ultimately, the electro-osmotic term can be expressed as products of a dimensional prefactor and two dimension-less functions of temporal variables and cross-sectional co-ordinates:

$$f_{os} = -G\bar{f}(h,t)\bar{g}(r_{\parallel}) \quad (4)$$

where the constant G is $k^2 \Psi_w \Phi_0 \varepsilon_g/l$. The separated form of $f_{os}$ in Eq.4 is both concise and convenient.

Dynamics of the system is governed by eqs.1 and 4 along with the integral mass conservation:

$$\frac{dh}{dt} = \frac{1}{A} \int v_z dA. \quad (5)$$

It is to be noted that Eq.1 is only valid for unidirectional flow. Hence, it cannot reveal the details of hydrodynamic fields just outside the entrance and the space adjacent to the moving front where the fluid velocity is three-dimensional. Still, Eq.1 can include the relevant effects of these three-dimensional structures on the overall transport dynamics if the pressure gradient term in the relation is modified properly. The overall pressure-drop was calculated in both entry and front regions from simplifying considerations, and adjust the pressure gradient in the one dimensional momentum equation accordingly. When such modification is integrated with Eqs.1, 4 and 5, a rigorous formulation to describe the unsteady intrusion of encroaching liquid can be constructed.

The dynamics are analyzed in non-dimensional form which requires proper recognition of the scales for time, intruded length, velocity, pressure and cross-sectional dimension. These scaling constants are defined as $t_s$, $h_s$, $V_s$, $P_s$ and $l_c$, respectively.

Among the scaling parameters, $P_s$ and $l_c$ can be determined from the geometry and the physical properties of the medium. $P_s$ was obtained by equating forces due to pressure and capillary action at the propagating front, and identify $l_c$ to be area-to-perimeter ratio:

$$P_s = \gamma s/A \quad l_c = A/s. \quad (6)$$

Here $\gamma$ is a constant which gives the net capillary force along z if multiplied by the cross-sectional projection of the perimeter. It is given either by the product of the liquid-air surface tension and cosine of contact angle or by the difference between coefficients for solid-air and solid-liquid interfaces. The typical system of interest would have a capillary number $Ca = \mu \sqrt{\rho \gamma l_c}$ around $10^{-3}$. For such a low capillary number, $\gamma$ is independent of time. For higher Ca, the contact angle itself should change with the transport-rate, and $\gamma$ should be treated as a time-dependent quantity. This effect is, however, very negligible when Ca<0.1. As a result, none of the previous studies has considered any transient variation in contact angle or $\gamma$.

Unlike $P_s$ and $l_c$, other remaining scales $V_s$, $h_s$, $t_s$ cannot be determined solely from obvious geometric or physical parameters. Instead, these have to be quantified by coupling time-range for experimental observation with flow-kinematics which makes $V_s$ to be the ratio of $h_s$ and $t_s$. The experiment of interest requires parity between relevant effects leading to the evaluation of the undetermined scales. Accordingly, both the characteristic transient and viscous forces are equated to the pressure term in the governing equation. Such consideration yields:

$$V_s = \sqrt{\frac{\gamma s}{\rho A}}, \quad t_s = \frac{\rho l_c^2}{\mu}, \quad h_s = \frac{l_c^2}{\mu} \sqrt{\frac{\gamma \rho s}{A}}. \quad (7)$$

As a result, the dimensional governing equation of the unsteady flow field in Eq. 1 and Eq. 5 finally have the form:

$$\frac{\partial \bar{v}_z}{\partial \bar{t}} = \bar{\nabla}_\parallel^2 \bar{v}_z - \frac{\partial \bar{p}}{\partial \bar{z}} + \delta \bar{f} \bar{g} \quad (8)$$

$$\frac{d\bar{h}}{d\bar{t}} = \frac{1}{A} \int \bar{v}_z dA$$

where $\bar{v}_z = v_z/V_s$, $\bar{t} = t/t_s$, $\bar{p} = p/P_s$, $\bar{h} = h/h_s$, $\bar{z} = z/h_s$ and $\bar{\nabla}_\parallel$ is the cross-sectional gradient in $\bar{r}$ normalized by lc. The non-dimensional constant $\delta$ is the ratio of electro-osmotic and capillary forces:

$$\delta = G\sqrt{A}/(\rho\gamma s). \quad (9)$$

This parameter is treated as a dimension-less constant representing the influence of the electro-osmotic effect on the dynamics.

Unlike past studies, present formulation disregards any effect of entry loss for the flow coming into the channel. The reason is the consideration of a free-surface reservoir instead of an infinite source of continuum fluid assumed by previous works. Such arrangement is especially relevant for rheological applications where the fluid would be drawn from a drop into the channel by capillary action. This makes this analysis different from other formulations. It is to be noted that the present calculation considers ambient pressure to be at the channel inlet as long as it is placed very near to the free surface. In contrast, all previous efforts in the art have assigned the ambient pressure to be far away from the entry point. Hence, the effect of entry loss can simply be disregarded with the present invention.

In one embodiment a specific geometry was considered where fluid is confined between two parallel plates with separation distance w. In such slit-pore, the fluid is driven by combination of capillary effect and electro-osmotic force due to a constant electric potential.

According to Eq. 3, temporal variation in electro-osmotic effect has two sources. Firstly, the force is explicitly dependent on the unsteady penetration. Secondly, there can be addition transient feature if the applied potential itself is changing with time represented by the function $\bar{\phi}(\bar{t})$. As this electric potential is constant for the present circumstances, $\bar{\phi}(\bar{t})$ was considered to be equal to ±1 in Eq. 3 to calculate $\bar{f}$ depending on whether it is a facilitating or opposing force.

This analysis quantifies how the steady electric potential affects the penetration dynamics. For this purpose, the results were compared for both cases in presence and absence of electro-osmotic force.

Figure 2B:
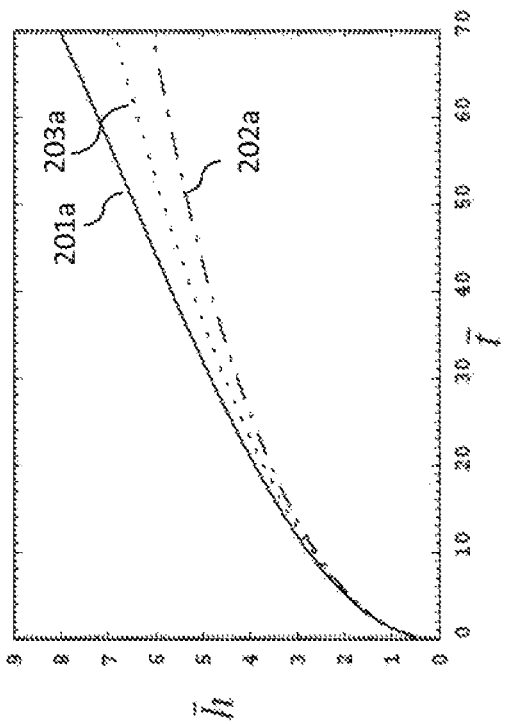
FIGS. 2A-2B depicts a chart where penetration length is plotted as function of time for facilitating (solid lines 201a, 201b), opposing (dash-dot lines 202a, 202b) and neutral (dotted lines 203a, 203b) electric potentials with, respectively, $l^-=10$ (FIG. 2A) and $l^-=30$ (FIG. 2B).
Figure 2A:
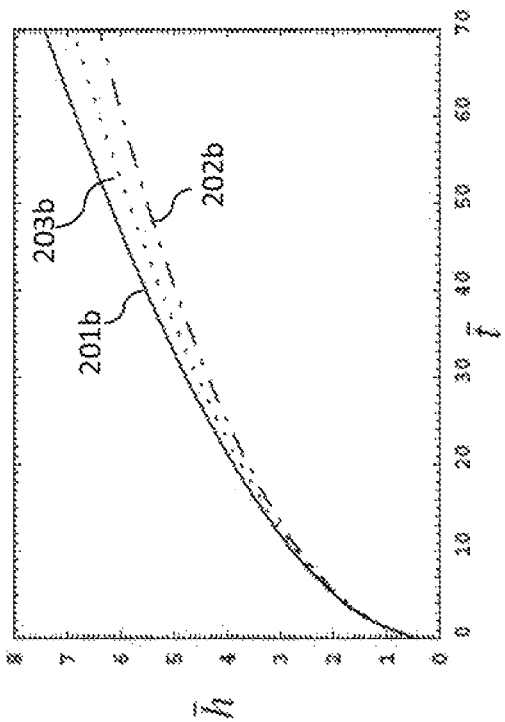

FIGS. 2A-2B are charts showing penetration depth as a function of time for the three aforementioned embodiments. Penetration length is plotted as function of time for facilitating (solid lines 201a, 201b), opposing (dash-dot lines 202a, 202b) and neutral (dotted lines 203a, 203b) electric potentials with, respectively, $\bar{l}=10$ (FIG. 2A) and $\bar{l}=30$ (FIG. 2B). In all cases, initial normalized pre-filled length $\bar{h}0$ is considered to be 0.5. The channel-length along the direction of the flow is considered to be either 10 or 30.

At initial stage, all three embodiments exhibit minimal difference with respective curves nearly coinciding. However, this deviation becomes considerably high in later time as Eq. 3 suggests more prominent electro-osmotic force when the channel is filled. Also, one can notice that the relative deviations of the penetration lengths are much greater for the shorter channel at a sufficiently long time.

Similarly, FIGS. 3A-3B show corresponding penetration-rate $\bar{h}$ of an encroaching fluid column as a function of time, wherein the charts show penetration rate plotted as function of time for facilitating (solid lines 301a, 301b), opposing (dash-dot lines 302a, 302b) and neutral (dotted lines 303a, 303b) electric potentials with, respectively, $\bar{l}=10$ (FIG. 3A) and $\bar{l}=30$ (FIG. 3B). At the initial time, this quantity accelerates to a high value when driving forces can easily supersede the viscous force acting on the fluid column. However, as viscous dissipation gets stronger with increasing intruded length, $\bar{h}$ starts to decay at the later time.

The current embodiment therefore involves measuring the impact of the capillary force alone or the combined impact of capillary and electro-osmotic forces affecting unsteady encroachment of a liquid in a narrow conduit by providing detailed simulation with arbitrary time-dependent electro-osmotic force.

FIGS. 4A-4D depict a chart where computed values (solid lines 401a-401d) of first-order penetration length are compared with its approximate analytical expression (dotted lines 402a-402d) for opposing (FIGS. 4A-4B) and facilitating (FIGS. 4C-4D) electric potentials with, respectively, $\bar{l}=1$ (FIGS. 4A, 4C, respectively) and $\bar{l}=3$ (FIGS. 4B, 4D, respectively). FIGS. 4A-4B show the distinction between analytically modeled and numerically computed first order penetration depth as a function of time. The channel length in the flow-direction is considered to be either 10 or 30. In FIGS. 4A-4B, the plots exhibit unsteady intrusion when an opposing electric potential is applied. In contrast, FIGS. 4C-4D represent unsteady penetration when a facilitating potential field is considered. In all these cases, negligible difference is evident between the two quantities whose respective curves are nearly coinciding within the considered time period.

After some initial time, one can notice that the penetration-rates are nearly coinciding. However, when the encroaching fluid is approaching near the end of the channel, the deviation between the two curves becomes more prominent again. It happens because the electro-osmotic effect is more prominent at that point.

In another embodiment of the present invention, described is the effect of unsteady electro-osmotic force due to periodically fluctuating electric potential on the penetration dynamics of a fluid column inside a narrow slit-pore channel. Hence, the geometry dictating parameters for the present analysis are same as the ones in the earlier system involving the constant electric potential.

Initially, the predominant force is due to the capillary effect which does not depend on the channel length or the forcing frequency. As result, penetration length varies similarly in all considered cases at the initial time. However, when the channel is nearly filled, frequency-dependent electro-osmotic force becomes significant, and causes perceptible variation among the curves. This is why the relative deviation of the intrusion lengths at later time is much greater for the shorter conduit.

Figure 5A:
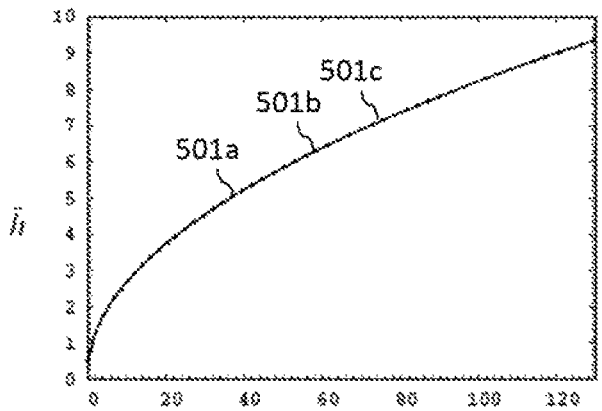
FIG. 5A-5C depicts penetration lengths are plotted as functions of time for Sl=4.0 (FIG. 5A), 1.0 (FIG. 5B) and 0.25 (FIG. 5C) with, respectively, $l^-=10$ (solid lines 501a-501c), 20 (dotted lines 502a-502c) and 30 (dashed lines 503a-503c).
Figure 5B:
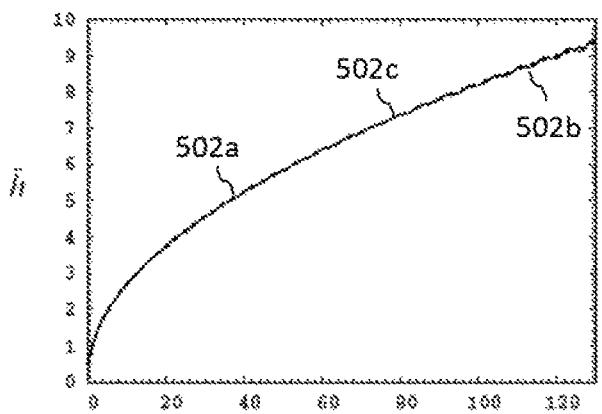
Figure 5C:
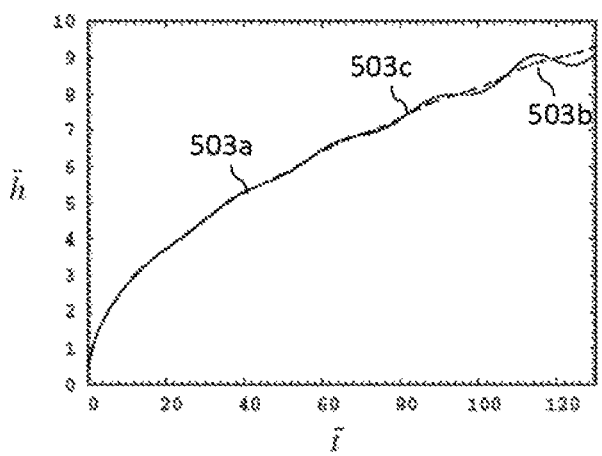
Figures 6A, 6B, 6C:
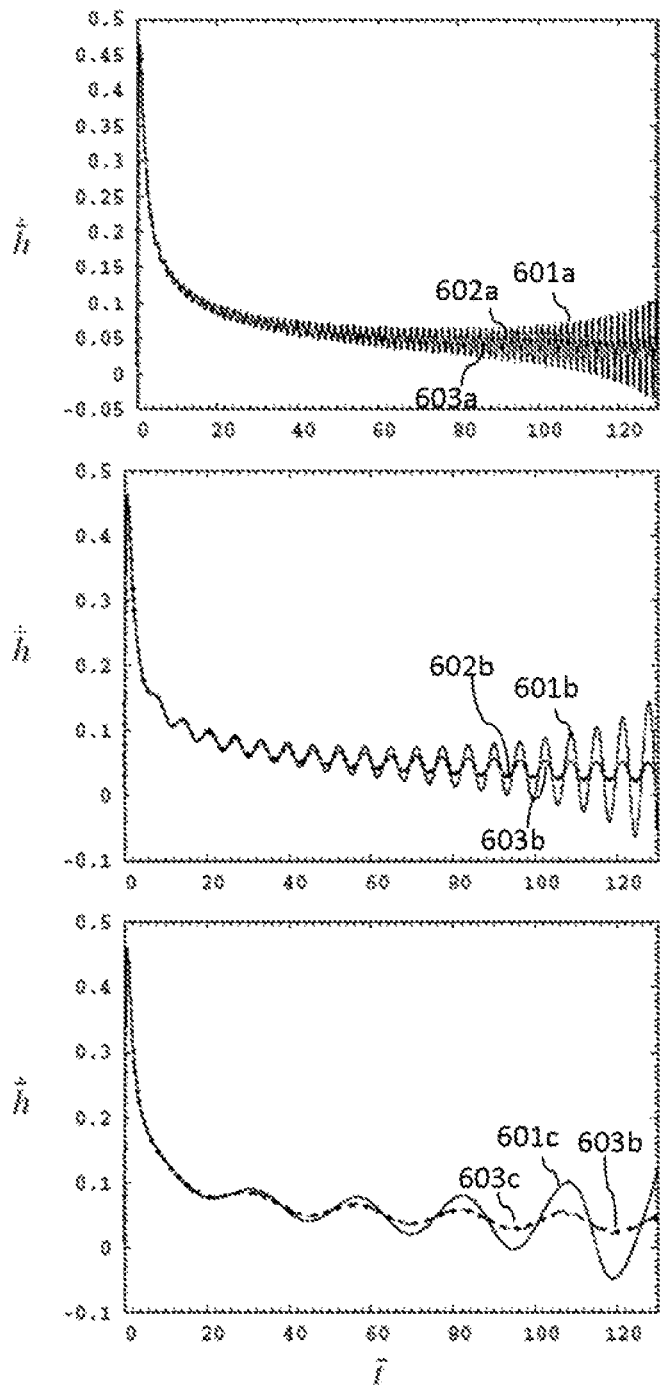
FIG. 6A-6C depicts penetration rates plotted as functions of time for Sl=4.0 (FIG. 6A), 1.0 (FIG. 6B) and 0.25 (FIG. 6C) with, respectively, $l^-=10$ (solid lines 601a-601c), 20 (dotted lines 602a-602c) and 30 (dashed lines 603a-603c).

The curves in FIGS. 5A-5C and 6A-6C illustrate a phenomenon with two time-scales where the first describes initial dynamics driven by surface tension, and the other shows the manifestation of periodically fluctuating electric potential. FIG. 5A-5C depicts penetration lengths are plotted as functions of time for Sl=4.0 (FIG. 5A), 1.0 (FIG. 5B) and 0.25 (FIG. 5C) with, respectively, $\bar{l}=10$ (solid lines 501a-501c), 20 (dotted lines 502a-502c) and 30 (dashed lines 503a-503c). FIG. 6A-6C depicts penetration rates plotted as functions of time for Sl=4.0 (FIG. 6A), 1.0 (FIG. 6B) and 0.25 (FIG. 6C) with, respectively, $\bar{l}=10$ (solid lines 601a-

601c), 20 (dotted lines 602a-602c) and 30 (dashed lines 603a-603c). The time-scale defined in Eq. 7 emphasizes the period where capillary action is important. As a result, all curves in FIGS. 6A-6C show exact same behavior at the initial time where predominance of frequency-invariant capillary force is assured. However, when Eq. 7 is used for temporal scaling, the fluctuation frequency in later time varies with Strouhal number due to the enhanced electro-osmotic force in nearly filled channel. In contrast, if one rescales the time based on the electrical fluctuation then the plots should exhibit similar oscillation in the later time while showing distinguishable initial decay characteristics.

In another embodiment, a simplified but approximate mathematical model describes the un-steady intrusion in the channel in presence of a periodically fluctuating electric potential. This analysis would help to understand intrusion dynamics in presence of electro-osmotic effect due to such time-dependent force.

The present invention provides a detailed description of the modification in intrusion dynamics of a viscoelastic substance, and further details the impact to a viscous medium due to the presence of electro-osmotic effect in addition to driving capillary force. The contributing electro-osmotic force is considered to be due to either constant or alternating voltage causing contrasting features in unsteady penetrated length. The embodiments herein also explore influence of the channel length on the transport process.

A key contribution of the present invention is derivation of a set of ordinary differential equations describing the penetration dynamics in terms of intruded length and transient amplitudes of eigen function expansion of time-dependent flow profile. Such approach rectifies the finite and removable error in the estimate of unsteady encroachment length of the fluid obtained from quasi-steady approximation of unidirectional velocity field. The formulation is presented in a non-dimensional form so that relevant dimension-less parameters as well as proper scales of the involved variables can be identified in embodiments described herein.

When the developed mathematical theory is used to analyze a system under influence of steady electric potential, the results illustrate how the intrusion rate is affected by the electro-osmotic force especially at the later stages. As expected, the stronger manifestation of electro-osmotic effect is exhibited when the channels are nearly filled, because electrical force becomes relatively more predominant compared to the capillary action in such configurations.

For both cases with steady or unsteady potential, perturbation analysis develops simplified reduced models which describe the essential features of the complicated dynamics. For the constant electro-osmotic force, the first order perturbation in intruded length is approximately described by a single first order differential equation. In contrast, the long-time behavior of the system under the influence of alternating voltage is explicitly derived in terms of frequency-dependent parameters. These approximate results agree well with the detailed computations providing validity of both perturbation theory and exact analysis.

In one embodiment, the present invention describes encroachment of a viscoelastic fluid instead of a purely viscous liquid. Such analysis forms the working principle for a rheometric instrument where both surface tension and electro-osmotic force drive the transient capillary penetration of the medium of interest. The device is capable of recording the time vs. penetration data from which the rheological properties of the medium can be predicted. For the detection purpose, the estimation of a known system would be matched to the stored results by iterative selection of rheological properties. This measurement procedure presents a novel technique for inexpensive as well as convenient rheometry with both commercial and scientific potential.

The present invention proves the potential of the significant temporal variations in the penetration rate from which the rheological coefficients can be detected. This establishes the viability of the proposed embodiments of the present invention. Secondly, the consistent corroboration between the rigorous formulation and the asymptotic theories shows the correctness of the results. Thus, the present embodiments serve as a crucial feasibility and validity test for the new rheometric device.

In one embodiment, the system of the present invention may involve a single channel, or it may be arranged in a series or array. The applications are capable of micro- and nanofluidic environments, requiring only a small amount of the viscoelastic substance. The present invention is capable of being used in product testing and quality control, confirming rheological properties of paints and adhesives, as well as other industrial viscoelastic substances, such as fuels and lubricants. In an alternative embodiment, the present invention is used for clinical testing of biological samples, including rapid diagnostic tests for disease like sickle-cell anemia. In yet another embodiment, the present invention may be generally applied to the field of rheology and material science. It is typically very difficult to determine viscoelasticity of complex fluids like polymeric solutions which are very important components in many chemical and transport processes. The measurement device of the present invention will be especially equipped to characterize such liquids, because these are generally responsive to non-mechanical forces.

Further information regarding the capillary pressure-based embodiments of the present invention is set forth in the reference, *J. Fluid Mech.* (2017), vol. 830, pp. 528-552, co-authored by the inventor, entitled "Transient penetration of a viscoelastic fluid in a narrow capillary channel", hereby incorporated by reference in their entirety of such purposes.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among various applications, including the use of one or more processors. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known, including the incorporation of traditional rheometers. Thus, myriad combinations are possible in achieving the functions, features, and preferences described herein. Moreover, the scope of the present disclosure covers conventionally known manners for carrying out the described features as well as those variations and modifications that may be made to the processes, composition, or compounds described herein as would be understood by those skilled in the art now and hereafter.

Furthermore, the embodiments of methods presented and described as diagrams, schematics or flowcharts in this disclosure (such as the Figures) are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

REFERENCES

WASHBURN, E; Title: The Dynamics of Capillary Flow; Journal: Phys Rev; Volume: 17; Pages: 273-283; Year:1921.

HAMRAOUI, A., and NYLANDER, T; Title: Analytical Approach for the Lucas Wash-Burn Equation; Journal: J. Colloidal Interface Sci; Volume: 250; Pages: 415-421; Year: 2002.

XIAO, Y., YANG, F., and PITCHUMANI, R.; Title: A Generalized Analysis of Capillary Flows in Channels; Journal: J. Colloidal Interface Sci; Volume: 298; Pages: 880-888; Year:2006.

WAGHMARE, P., and MITRA, S; Title: Modeling of Combined Electroosmotic and Capillary Flow in Microchannels; Journal: Anal. Chim. Acta; Volume:663; Pages: 117-126; Year:2010.

BHATTACHARYA, S., and GURUNG; Title: Derivation of Governing Equation 593 Describing Time-Dependent Penetration Length in Channel Flows Driven by Non-Mechanical Forces; Journal: Anal. Chim. Acta; Volume: 666; Pages:51-54; Year:2010.

MARTIN NDI AZESE; Title: Modified Time-Dependent Penetration Length and Inlet Pressure Field in Rectangular and Cylindrical Channel Flows Driven by Non-Mechanical Forces; Journal: J. Fluid Engineering; Volume: 33; Pages: 111205(1-12); Year:2011.

LEVINE, S., REED, P. and WATSON, E.; Title: A Theory of the Rate of Rise of a Liquid in a Capillary; Journal: J. Colloid and Interface Sci.; Volume:5; Pages: 403-419; Year: 1976.

WAGHMARE, P., and MITRA, S; Title: On the Derivation of Pressure Field Distribution at the Entrance of a Rectangular Channel; Journal: ASME J. Fluid Eng; Volume: 132; Pages: 1-4; Year: 2010.

ROSENDAHL, U., and GRAH, A., and Dreyer, E.; Title: Convective dominated flows in open capillary channels; Journal: Phy. of Fluids; Volume: 22; Pages: 052102(1-13); Year:2010.

WAGHMARE, P., and MITRA, S; Title: A comprehensive theoretical model of capillary transport in rectangular microchannels; Journal: Microfluidic Nanofluid; Volume: 10; Pages:1-11; Year:2011

WAGHMARE, P., and MITRA, S; Title: Finite reservoir effect on capillary flow of microbead suspension in rectangular microchannels; Journal: J. Colloid and Interface Sci; Volume: 351; Pages: 561-569; Year:2010

FRIES, N, and DREYER, M; Title: The transition from inertial to viscous flow in capillary rise; Journal: J. Colloid and Interface Sci; Volume:327; Pages: 125-128; Year: 2008.

DREYER, M. and DELGADO, A. and RATH, H. J.; Title: Fluid Motion in Capillary Vanes Under Reduced Gravity.; Journal: Microgravity Sc. Technol.; Volume:4; Pages:203-210; Year: 1993.

ARADA, N., PIRES, M. & SEQUEIRA, A. 2005 Numerical simulation of shear-thinning Oldroyd-B fluid in curved pipes. *IASME Trans.* 2, 948-959.

AZESE, M. N. 2011 Modified time dependent penetration length and inlet pressure field in rectangular and cylindrical channel flows driven by non mechanical forces. *Trans. ASME J. Fluids Engng* 133, 1112051.

BAZILEVSKY, A. V., KORNEV, K. G., ROZHKOV, A. N. & NEIMARK, A. V. 2003 Spontaneous absorption of viscous and viscoelastic fluids by capillaries and porous substrates. *J. Colloid Interface Sci.* 262, 16-24.

BHATTACHARYA, S., AZESE, M. N. & SINGHA, S. 2016 Rigorous theory for transient capillary imbibition in channels of arbitrary cross-section. *Theor. Comput. Fluid Dyn.* 31 (2), 137-157.

BHATTACHARYA, S. & GURUNG, D. 2010 Derivation of governing equation describing time-dependent penetration length in channel flows driven by non-mechanical forces. *Anal. Chim. Acta* 666, 51-54.

CHEBBI, R. 2007 Dynamics of liquid penetration into capillary tubes. *J. Colloid Interface Sci.* 315, 255-260.

DAS, S., WAGHMARE, P. R. & MITRA, S. K. 2012 Early regimes of capillary filling. Phys. Rev. E 86, 067301.

FAN, Y., TANNER, R. & PHAN-TIEN, N. 2001 Fully developed viscous and viscoelastic flow in curved pipes. *J. Fluid Mech.* 440, 327-357.

FELDERHOF, B. U. 2009 Estimating the viscoelastic moduli of a complex fluid from observation of Brownian motion. *J. Chem. Phys.* 131, 164904.

GROISMAN, A., ENZELBERGER, M. & QUAKE, S. R. 2003 Microfluidic memory and control devices. *Science* 300, 955-958.

ICHIKAWA, N., HOSOKAWA, K. & MAEDA, R. 2004 Interface motion of capillary driven flow in rectangular microchannel. *J. Colloid Interface Sci.* 280, 155-164.

KANG, Y. J. & LEE, S. J. 2013 Blood viscoelasticity measurement using steady and transient flow controls of blood in a microfluidic analogue of Wheatstone-bridge channe. *Biomicrofluidics* 7, 054122.

KHUZHAYOROV, B., AURIAULT, J. L. & ROYER, P. 2000 Derivation of macroscopic filtration law for transient linear viscoelastic fluid flow in porous medium. *Intl J. Engng Sci.* 38, 487-505.

KOSER, A. E. & PAN, L. C. 2013 Measuring material relaxation and creep recovery in a microfluidic device. *Lab on a Chip* 13, 1850-1853.

MARMUR, A. & COHEN, R. D. 1997 Characterization of porous media by the kinetics of liquid penetration: the vertical capillaries model. *J. Colloid Interface Sci.* 189, 299-304.

MITSOULIS, E. & HENG, F. L. 1987 Extrudate swell of Newtonian fluids from converging and diverging annular dies. *Rheol. Acta* 26, 414-417.

MORA, S. & MANNA, M. 2010 Saffman-Taylor instability of viscoelastic fluids from viscous fingering to elastic fracture. *Phys. Rev. E* 81, 026305.

PATANKAR, S. 1980 *Numerical Heat Transfer and Fluid Flow*. McGraw-Hill. QUERE, D. 1997 Inertial capillarity. *Eur. Phys. Lett.* 39, 533-538.

ROUSSE, P. E. JR. 1953 A theory of the linear viscoelastic properties of dilute solutions of coiling polymers. *J. Chem. Phys.* 21, 1272-1280.

STANGE, M., DREYER, M. E. & RATH, H. J. 2003 Capillary driven flow in circular cylindrical tubes. *Phys. Fluids* 15, 2587-2601.

SZEKELY, J., NEUMANN, A. W. & CHUANG, Y. K. 1970 the rate of capillary penetration and the applicability of the Washburn equation. *J. Colloid Interface Sci.* 35, 273-278.

WAGHMARE, P. & MITRA, S. 2010a On the derivation of pressure field distribution at the entrance of a rectangular channel. *Trans. ASME J. Fluids Engng* 132, 054502.

WAGHMARE, P. R. & MITRA, S. K. 2010b Modeling of combined electroosmotic and capillary flow in microchannels. *Anal. Chim. Acta* 663, 117-126.

WASHBURN, E. W. 1921 The dynamics of capillary flow. *Phys. Rev.* 17, 273-283.

ZHMUD, B. V., TIBERG, F. & HALLSTENSSON, K. 2000 Dynamics of capillary rise. *J. Colloid Interface Sci.* 228, 263-269.

ZILZ, J., SCHAFER, C., WAGNER, C., POOLE, R. J., ALVES, M. A. & LINDER, A. 2014 Serpentine channels: micro-rheometers for fluid relaxation times. *Lab on a Chip* 14, 351-358.

KESTIN, J., SOKOLOV, M., and WAKEHAM, W., 1973. "Theory of capillary viscometers". *Applied Scientific Research,* 27(1), pp. 241-264.

BOUKELLAL, G., DURIN, A., VALETTE, R., and AGASSANT, J., 2011. "Evaluation of a tube-based constitutive equation using conventional and planar elongation flow optical rheometers". *Rheologica Acta,* 50, pp. 547-557.

Perez-Orozco, J., Beristain, C., Espinosa-Paredes, G., Lobato-Calleros, C., and VERNON-CARTER, E., 2004. "Interfacial shear rheology of interacting carbohydrate polyelectrolytes at the water-oil interface using an adapted conventional rheometer". *Carbohydrate Polymers,* 57, pp. 45-54.

TS., N., 1986. "A comparative study of the extensional rheometer results on rubber cCompounds with values obtained by conventional industrial measuring methods". *Kautschuk Gummi Kunst-stoffe,* 39, pp. 830-833.

MASON, T. G., GANESHAN, K., VANZANTEN, J., WIRTZ, D., and KUO, S., 1997. "Particle tracking microrheology of complex fluid". *Phys. Rev. Lett.,* 79, pp. 3282-3285.

MASON, T. G., 2000. "Estimating the viscoelastic moduli of complex fluids using the generalized Stokes-Einstein equation". *Rheol. Acta.,* 39, pp. 371-378.

SQUIRES, T., M., 2008. "Nonlinear microrheology:bulk stresses versus direct interactions". *Langmuir,* 24, pp. 1147-1159.

KOSER, A. E., and PAN, L. C., 2013. "Measuring material relaxation and creep recovery in a microfluidic device". *Lab on a Chip,* 13, pp. 1850-1853.

KANG, Y. J., and LEE, S. J., 2013. "Blood viscoelasticity measurement using steady and transient flow controls of blood in a microfluidic analogue of Wheastone-bridge channel". Biomicrofluidics, 7, p. ARTN:054122.

ZILZ, J., SCHAFER, C., WAGNER, C., POOLE, R. J., ALVES, M. A., and LINDER, A., 2014. "Serpentine channels: micro-rheometers for fluid relaxation times". *Lab on a Chip,* 14, pp. 351-358.

GROISMAN, A., ENZELBERGER, M., and QUAKE, S. R., 2003. "Microfluidic memory and control devices". *Science,* 300, pp. 955-958.

WASHBURN, E. W., 1921. "The dynamics of capillary flow". The Physical Review, 17, pp. 273-283.

LUCAS, R., 1918. "Ueber das Zeitgesetz des kapillaren Aufstiegs von Flussigkeiten". Kolloid-Zeitschrift, 23, pp. 15-22.

SZEKELY, J., NEUMANN, A. W., and CHUANG, Y. K., 1970. "The rate of capillary penetration and the applicability of the Washburn equation". Journal of Colloid and Interface Science, 35, pp. 273-278.

CHEBBI, R., 2007. "Dynamics of liquid penetration into capillary tubes". Journal of Colloid and Interface Science, 315, pp. 255-260.

WAGHMARE, P. R., and MITRA, S. K., 2008. "Investigation of combined electroosmotic and pressure driven flow in rough microchannels". ASME J. Fluids Engineering, 130, pp. 061204-1 061204-7.

WAGHMARE, P. R., and MITRA, S. K., 2010. "On the derivation of pressure field distribution at the entrance of a rectangular capillary". ASME J. Fluids Engineering, 132, pp. 054502-1 054502-4.

WAGHMARE, P. R., and MITRA, S. K., 2010. "Modeling of combined electro-osmotic and capillary flow in microchannels". Analytica Chimica Acta, 663, pp. 117-126.

DAS, S., WAGHMARE, P. R., and MITRA, S. K., 2012. "Early regimes of capillary filling". Physical Review E, 86, p. ARTN:067301.

BHATTACHARYA, S., AZESE, M. N., and SINGHA, S., 2016. "Rigorous theory for transient capillary imbibition in channels of arbitrary cross section". Theoretical and Computational Fluid Dynamics, 31, pp. 1-21.

ICHIKAWA, N., and SATODA, Y., 1993. "Interface dynamics of capillary flow in a tube under negli-gible gravity condition". Journal of Colloid and Interface Science, 162, pp. 350-355.

MARMUR, A., and COHEN, R. D., 1997. "Characterization of porous media by the kinetics of liquid penetration: the vertical capillaries model". Journal of Colloid and Interface Science, 189,pp. 299-304.

BARRY, D. A., PARLANGE, J. Y., SANDER, G. C., and SIVAPLAN, M., 1992. "A class of exact solutions of Richard's equation". Journal of Hydrology, 142, pp. 29-46.

ZHMUD, B. V., TIBERG, F., and HALLSTENSSON, K., 2000. "Dynamics of capillary rise". Journal of Colloid and Interface Science, 228, pp. 263-269.

MAWARDI, A., XIAO, Y., and PITCHUMANI, R., 2008. "Theoretical analysis of capillary-driven nanoparticulate slurry flow during a micromold filling process". International Journal of Multi-phase Flow, 34, pp. 227-240.

HOUSIADAS, K., GEORGIOU, G., and TSAMOPOULOS, J., 2000. "The steady annular extrusion of a Newtonian liquid under gravity and surface tension". International Journal for Numerical Methods in Fluids, 33, pp. 1099-1119.

MITSOULIS, E., and HENG, F. L., 1987. "Extrudate swell of Newtonian fluids from converging and diverging annular dies". Rheologica Acta, 26, pp. 414-417.

ICHIKAWA, N., HOSOKAWA, K., and MAEDA, R., 2004. "Interface motion of capillary driven flow in rectangular microchannel". Journal of Colloid and Interface Science, 280, pp. 155-164.

FABIANO, W. G., SANTOS, L. O. E., and PHILIPPI, P. C., 2010. "Capillary rise between parallel plates under dynamic conditions". Journal of Colloid and Interface Science, 344, pp. 171-179.

BLAWZDZIEWICZ, J., and BHATTACHARYA, S., 2003. "Comment on "Drift without flux: Brownian walker with a space-dependent diffusion coefficient"". Europhys. Lett., 63, pp. 789-90.

BHATTACHARYA, S., and BLAWZDZIEWICZ, J., 2008. "Effect of smaller species on the near-wall dynamics of a large particle in bidispersed solution". J. Chem. Phys., 128, p. ARTN.214704.

NAVARDI, S., and BHATTACHARYA, S., 2010. "Effect of confining conduit on effective viscosity of dilute colloidal suspension". *J. Chem. Phys.*, 132, p. ARTN:114114.

NAVARDI, S., and BHATTACHARYA, S., 2010. "A new lubrication theory to derive far-field axial pressure-difference due to force singularities in cylindrical or annular vessels". *J. Math. Phys.*, 51, p. ARTN:043102.

JONG, W. R., KUO, T. H., HO, S. W., CHIU, H. H., and PENG, S. H., 2007. "Flows in rectangular microchannels driven by capillary force and gravity". *International Communications in Heat and Mass Transfer*, 34, pp. 186-196.

NAVARDI, S., and BHATTACHARYA, S., 2010. "Axial pressure-difference between far-fields across a sphere in viscous flow bounded by a cylinder". *Phys. Fluid*, 22, p. ARTN.103306.

BHATTACHARYA, S., GURUNG, D., and NAVARDI, S., 2013. "Radial distribution and axial dispersion of suspended particles inside a narrow cylinder due to mildly inertial flow". *Phys. Fluids*, 25, p. ARTN.033304.

BHATTACHARYA, S., GURUNG, D., and NAVARDI, S., 2013. "Radial lift on a suspended finite sized sphere due to fluid inertia for low Reynolds number flow through a cylinder". *J. Fluid Mech.*, 722, pp. 159-186.

BHATTACHARYA, S., and GURUNG, D., 2010. "Derivation of governing equation describing time-dependent penetration length in channel flows driven by non-mechanical forces". *Analytica Chimica Acta*, 666, pp. 51-54.

AZESE, M. N., 2011. "Modified time dependent penetration length and inlet pressure field in rectangular and cylindrical channel flows driven by non mechanical forces". *ASME J. Fluids Engineering*, 133, pp. 1112051-11120512.

SUMANASEKARA, U., AZESE, M., and BHATTACHARYA, S., 2017. "Transient penetration of a viscoelastic fluid in a narrow capillary channel". *J. Fluid Mech.*, 830, pp. 528-552.

STANGE, M., DREYER, M. E., and RATH, H. J., 2003. "Capillary driven flow in circular cylindrical tubes". *Physics of Fluids*, 15, pp. 2587-2601.

What is claimed is:

1. A system for determining viscoelastic properties of a viscoelastic substance comprising:
   (a) a free surface for introduction of said viscoelastic substance in a form of a drop;
   (b) an inlet in a capillary channel brought in contact with said free surface for receiving said viscoelastic substance;
   (c) the capillary channel in fluid communication with said inlet and, wherein
      (i) the capillary channel has an area A and a perimeter s,
      (ii) the capillary channel is arranged horizontally to the free surface so that gravity does not affect flow dynamics,
      (iii) the capillary channel has a longitudinal direction, and
      (iv) the viscoelastic properties are based upon measurement of time-dependent penetration of a creeping viscoelastic substance under an action of a capillary force; and
   (d) an electric potential applied to the longitudinal direction of the capillary channel, wherein the electrical potential is positioned to induce additional transiency in the flow dynamics of the viscoelastic substance by an electro-osmotic force, wherein the measurement of time-dependent penetration of a creeping viscoelastic substance having fluctuating electric potential on an inside surface of the capillary channel is configured to determine a frequency-dependent viscosity of the viscoelastic substance.

2. The system of claim 1, wherein the capillary channel is an axisymmetric rheometer.

3. The system of claim 1, wherein the capillary channel is comprised of an open channel flow having at least one surface which is a free surface.

4. The system of claim 1, wherein the measurement comprises forces selected from a group consisting of: capillary, gravitational, electric, magnetic, and combinations thereof.

5. The system of claim 1, wherein the measurement comprises one or more forces not requiring relative velocity between solid surfaces in order to induce transport of a viscoelastic substance.

6. The system of claim 1, comprising determining rheological coefficients G' and G" to further determine an amplitude and a phase difference of a sinusoidal strain-rate in the viscoelastic substance under the action of a sinusoidal stress.

7. The system of claim 1, further comprising determining frequency-dependent coefficients of a viscoelastic substance by correlating one or more unsteady dynamics of the viscoelastic substance flow by relating a complex viscosity of the viscoelastic substance to its time-dependent penetration length within the channel.

8. A device for measuring viscoelastic properties of a viscoelastic substance comprising:
   (a) a drop of viscoelastic substance with free surface capable of being a source of fluid transport to a capillary channel;
   (b) an inlet for introduction of the said viscoelastic substance from the said drop to a fluid communication due to the sole or combined actions of non-mechanical forces;
   (c) a capillary channel in fluid communication with a first opening, wherein
      (i) the capillary channel has an area A and a perimeter s, and
      (ii) the capillary channel is arranged horizontally to the free surface; and
   (d) at least one rheometric measurement instrument for time versus penetration data, wherein the viscoelastic substance in fluid communication with the capillary channel is capable of creeping into the capillary channel and capable of measurement with at least one measurement instrument; and
   (e) an electric potential applied to a longitudinal direction of the capillary channel, wherein the electrical potential is positioned to induce additional transiency in flow of the viscoelastic substance by an electro-osmotic force, wherein a measurement of time-dependent penetration of a creeping viscoelastic substance having fluctuating electric potential on an inside surface of the capillary channel is configured to determine a frequency-dependent viscosity of the viscoelastic substance.

9. The device of claim 8, wherein the capillary channel is a narrow one-dimensional channel having a determined cross-section.

10. The device of claim 8, wherein the capillary channel is a closed channel wherein non-mechanical force is capable of driving the viscoelastic substance.

11. The device of claim 10, wherein the capillary channel is rectangular.

12. The device of claim 10, wherein the capillary channel is an axisymmetric rheometer.

13. The device of claim 8, wherein the at least one measurement instrument is capable of determining rheological coefficients G' and G" to further determine an amplitude and a phase difference of a sinusoidal strain-rate in the viscoelastic substance under the action of a sinusoidal stress.

14. The device of claim 8, wherein the at least one measurement instrument is capable of rapid determination of frequency-dependent viscoelastic coefficients by relating a complex viscosity of a medium to its time dependent penetration length within a channel.

15. A method for determining viscoelastic properties of a viscoelastic substance comprising:
   (a) introducing a viscoelastic substance in a form of a drop onto a free surface having an inlet to a capillary channel through said inlet of the capillary channel via non-mechanical forces, wherein the step of introducing the viscoelastic substance into the channel comprises placing the viscoelastic substance on the free surface having contact with the inlet;
   (b) measuring a time-dependent penetration of a creeping viscoelastic substance inside the capillary channel; and
   (c) determining, by combined action of capillary force and electro-osmotic force in a presence of fluctuating electric potential on an encroaching capillary channel, a frequency-dependent viscosity of the viscoelastic substance driven by the capillary force of the viscoelastic substance in the capillary channel.

16. The method of claim 15, further comprising determining rheological coefficients G' and G" to further determine an amplitude and a phase difference of a sinusoidal strain-rate in the viscoelastic substance under the action of a sinusoidal stress.

17. The method of claim 15, further comprising determining frequency-dependent coefficients of a viscoelastic substance by correlating one or more unsteady dynamics of the viscoelastic substance flow by relating a complex viscosity of the viscoelastic substance to its time-dependent penetration length within the capillary channel.

18. The method of claim 15, further comprising recording time-dependent penetration depth by optical, electrical or mechanical means.

19. The method of claim 15, further comprising measuring the non-mechanical forces selected from a group consisting of: capillary, gravitational, electric, magnetic, and combinations thereof.

20. The method of claim 15, further comprising measuring one or more non-mechanical forces not requiring relative velocity between solid surfaces in order to induce transport of a viscoelastic substance.

21. The method of claim 15, further comprising determining frequency-dependent coefficients of a viscoelastic substance by relating its complex viscosity to its time-dependent penetration length within the capillary channel.

* * * * *